United States Patent [19]
Aigner

[11] Patent Number: 5,778,952
[45] Date of Patent: Jul. 14, 1998

[54] ADJUSTABLE RUN-ON STRIP

[76] Inventor: Georg Aigner, Thannenmais, D-94419 Reisbach, Germany

[21] Appl. No.: 851,251

[22] Filed: May 5, 1997

[30] Foreign Application Priority Data

May 4, 1996 [DE] Germany ........................ 196 17 888.6
Feb. 14, 1997 [DE] Germany ........................ 297 02 520.1

[51] Int. Cl.⁶ .............................. B27C 5/04; F16B 2/04
[52] U.S. Cl. ................. 144/253.2; 144/135.2; 144/251.2; 144/252.1; 144/253.1; 403/374
[58] Field of Search ................ 144/251.1, 251.2, 144/253.1, 134.1, 135.2; 403/372, 373, 374

[56] References Cited

U.S. PATENT DOCUMENTS 5,415,212  5/1995  Lenton ...................... 144/252.1
5,477,899  12/1995  Schmitt ..................... 144/252.1

Primary Examiner—W. Donald Bray
Attorney, Agent, or Firm—Cohen, Pontani, Lieberman & Pavane

[57] ABSTRACT

The present invention is directed to a run-on strip that can be adjusted more simply and quickly than the way described in the prior art and can be attached to a protective hood to ensure a smooth operation during adjustment, as well as during the movement of the run-on strip from a rest position to a working position or vice versa.

9 Claims, 5 Drawing Sheets

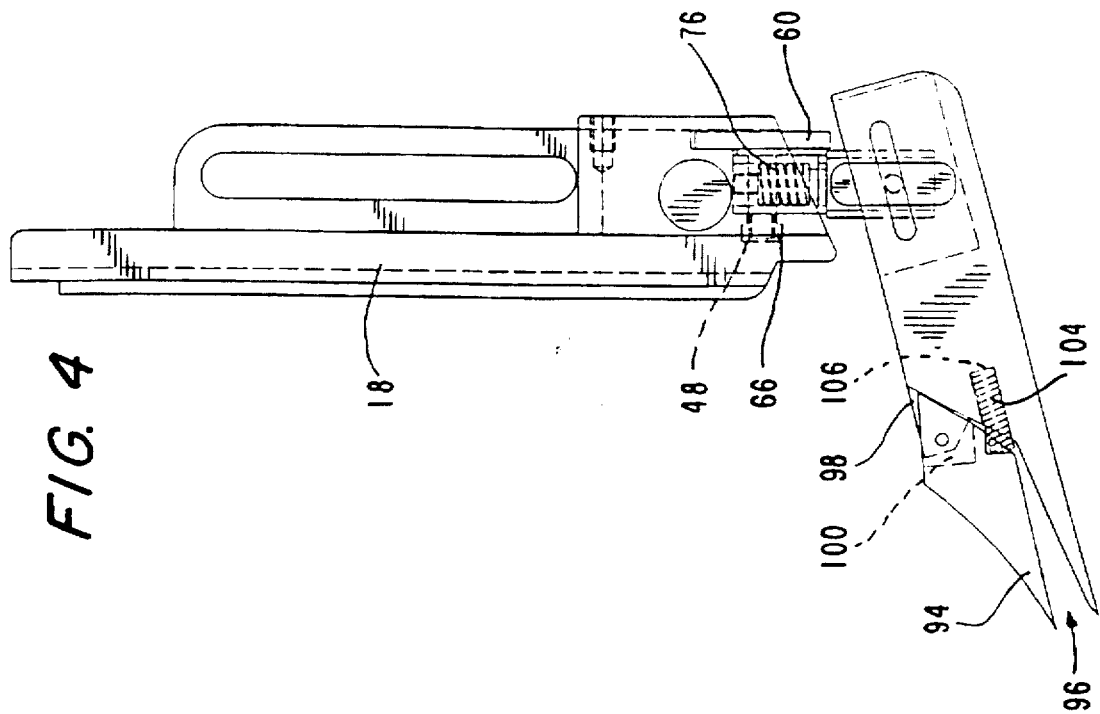
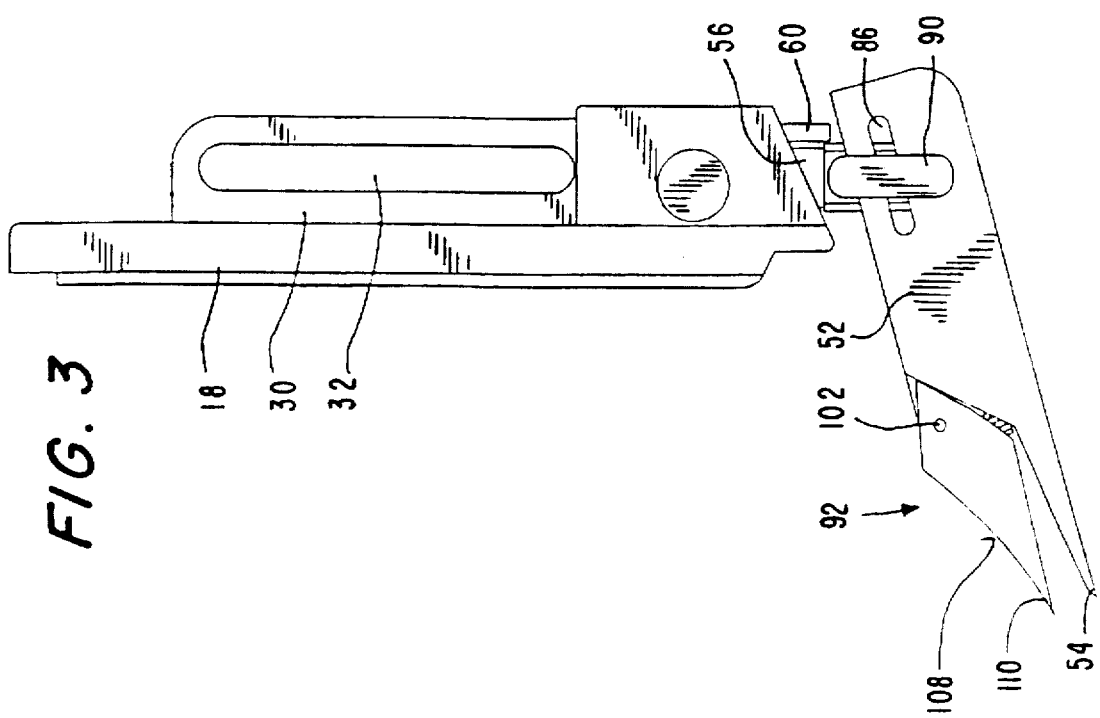

ADJUSTABLE RUN-ON STRIP

BACKGROUND OF THE INVENTION

1. Field of the Invention

The present invention relates to a run-on strip attached to a protective hood of a wood-milling machine through a clamping body in which a sliding bar extending outward from the clamping body adjustable connects the run-on strip to the clamping body.

2. Description of the Related Art

Protective hoods on wood-milling machines that have been used to cover milling tools attached to spindles includes two side walls connected to each other by a back wall, an adjustable front protective shield, and a lid with an opening for attaching an extraction device. The side walls have guides that hold a run-on strip in a vertically adjustable manner when the machine is vertically fixed on a horizontal working table. In operation, the run-on strip is brought in touch with a run-on ring to hold the run-on ring in a proper working position, while the run-on ring serves as a guide for a workpiece to be processed.

German patent 39 31 141 discloses a protective hood equipped with a run-on strip that is attached to a corner piece in such a manner as to be adjustable in a longitudinal direction. The corner piece, in turn, is attached in a vertically adjustable fashion to a clamping body in a vertical groove that is open toward the inside of the protective hood. This design makes it difficult to carry out adjustments, because the milling tool must first be disassembled to provide the necessary access to the interior screws. Another disadvantage is that the vertical groove open toward the inside of the protective hood becomes contaminated very quickly by dust and wood chips so that frequent cleaning must be conducted to permit vertical adjustment of the corner piece.

European patent 621 926 discloses a run-on strip of the aforementioned type which is attached in an easily accessible manner to a front edge of the protective hood to avoid the disadvantages described above. An adjustment screw is provided to operate the clamping body for vertical adjustment of the run-on strip without disassemblement of the milling tools. The adjustment screw, via a wedge, braces two head pieces against the walls of a vertical groove. The adjustment screw can also be used to loosen the run-on strip so that it can be pivoted out of a vertical rest position into a horizontal working position. However, turning the adjustment screw is often difficult to operate.

Moreover, neither the German patent nor the European patent has solved the problem that the free end of the run-on strip is so tightly placed against the run-on ring that the run-on ring cannot possibly be rotated by the high-speed cutter.

SUMMARY OF THE INVENTION

Accordingly, an object of the invention is to provide a run-on strip that can be adjusted more simply and quickly than the manner described in the prior art and can be attached to the protective hood to ensure a smooth operation during adjustment, even in the worst case, as well as during the movement from the rest position to the working position or vice versa.

According to the present invention, the invented run-on strip is connected to a guide of the side wall of the protective hood by a clamping body, including a sliding block with a boring, a sliding bar which is longitudinally movable against the force of a coiled spring surrounding one end of the sliding bar. This arrangement enables the sliding bar to be easily withdrawn by hand against the force of the spring to be pivoted from a first detent position to a second detent position located 90° relative to the first detent position, without assistance of any tools.

It is advantageous for a portion of the sliding bar that projects out from the sliding block to have a quadriform polygonal cross-section that can be seated into a corresponding polygonal seat in the sliding block in the two detent positions arranged at 90° relative to each other.

For the adjustment of the run-on strip on the sliding bar, a plate-like end extending outward from the sliding block fits into a recess on the run-on strip. The plate-like end may be shifted or locked in a position by way of an adjustment screw passing through a longitudinal slot on the upper side of the run-on strip.

To easily and securely position the run-on strip, a conical clamping body attached by a guide rail at its larger-diameter end may be employed to receive the adjustment screw. This conical clamping body fits into a conical boring in the plate-like end of the sliding bar, while the guide rail fits into a longitudinal slot located on the lower side of the run-on strip opposite the longitudinal slot on the upper side.

For adjustment of the sliding block, it is advantageous to engage the sliding block in a groove directed laterally outward from the protective hood, by means of the clamping block that is fixed in position by the clamping screw. The groove, which is so located, thus is free of contamination by dust and wood chips.

Another object of the present invention is to provide a friction braking element contacting the run-on ring at the free end of the run-on strip. This braking element functions to prevent the run-on ring from turning even when the run-on strip is unable to hold the run-on ring in a proper position due to inaccurate setting or wear.

The friction braking element may be made as an insert, which is placed in a recess open toward the run-on ring on the run-on strip. The insert is mounted on the run-on strip to be pivotal around a axis against the force of a spring when the run-on strip is in the horizontal working position. Furthermore, the insert has a concave curved surface facing the run-on ring, which makes it possible to position the insert—thus the run-on strip—tightly against the run-on ring. As a result workpieces brought into the milling position via the run-on strip can be moved into the area of the run-on ring almost without steps.

To further improve this smooth movement of the workpieces, the free pointed end of the curved surface of the insert, that rests against the run-on ring in a working position, is closely adjacent to the free projecting beak-shaped tip at the end of the recess in the run-on strip, when pivoted completely into the recess in the run-on strip against the force of the spring.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

The invention is briefly explained in reference to the drawings described below:

FIG. 3 is a top plan view of the run-on strip attached to one of the two side walls of the protective hood;

FIG. 4 is a view corresponding to that in FIG. 3 showing, in dashed lines, the mounting of the clamping body in a vertical groove on the side wall and the mounting of the friction braking element at the free end of the run-on strip;

DETAILED DESCRIPTION OF THE PRESENTLY PREFERRED EMBODIMENTS

Figure 1:
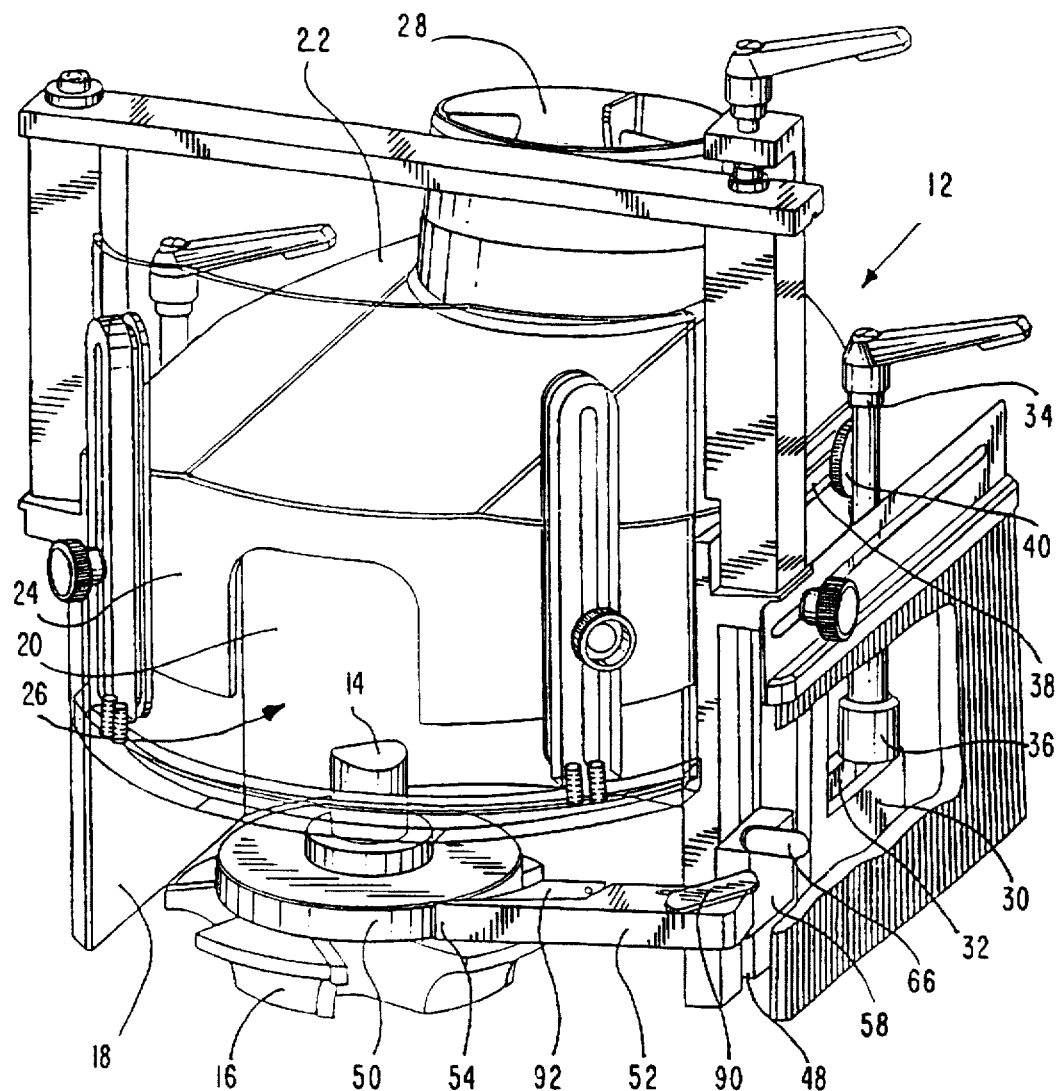
FIG. 1 is a perspective view of a protective hood for a wood-milling machine with a run-on strip according to the invention in its working position.
Figure 2:
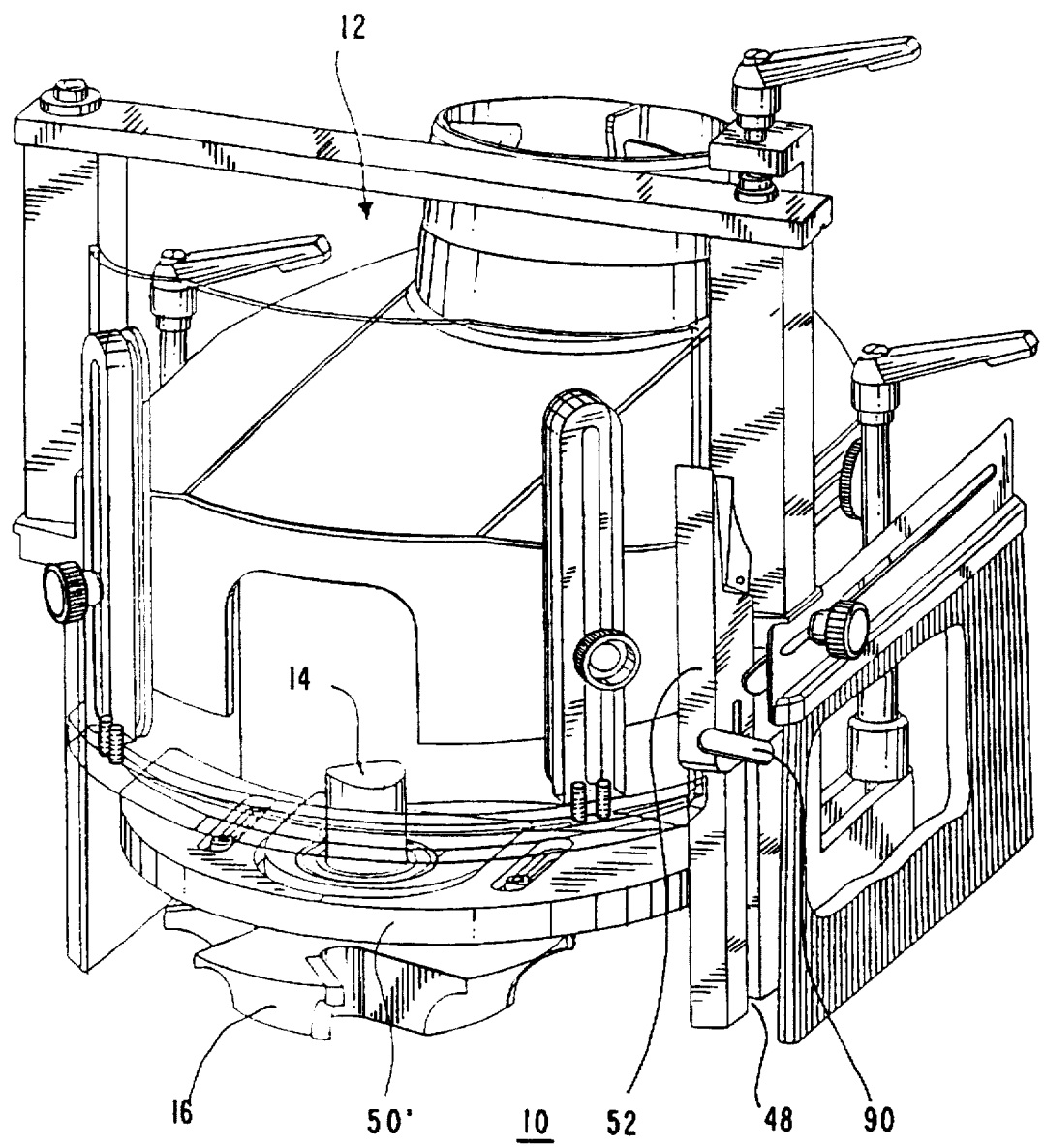
FIG. 2 is a view corresponding to that in FIG. 1, with the run-on strip pivoted up to its rest position.

Referring now to FIGS. 1 and 2 in detail, a horizontal machine table 10 of a woodmilling machine is shown, on which is fixed a protective hood 12 covering the working area of a cutting tool 16 attached to a spindle 14. The protective hood 12 includes two side walls 18, a back wall 20 connecting the side walls, and a lid 22, which forms a single piece with the back wall 20. A frontal wall 24 extends downward from the lid 22 at the front and on the sides. The wall 24 has a downwardly directed opening 26 in its front, which provides a view of the interior of the protective hood 12. The lid 22 has a connection 28 for attaching an extraction device (not shown) to its rear part.

Each side wall 18 has an outwardly projecting step 30 with a vertical slot 32 in its lower part. Each side wall is associated with a threaded end of a screw 34 inserted through the vertical slot 32. Each screw 34 has, in its middle area, a bushing 36, which rests on the upper side of the step 30. The threaded end of the screw 34 is screwed into a threaded boring in the machine table 10, so that the protective hood 12 can be fixed in a proper position on the table 10 by the screws 34.

On the top of each side wall 18, there is a horizontal slot 38, through which passes a knurled-head screw 40. The knurled-head screw 40 is screwed into a threaded boring on the edge 24 extending downward from the lid 22. When the knurled-head screw 40 is loosened, the side wall 18 can be pushed forward or backward relative to the protective hood 12.

Figure 5:
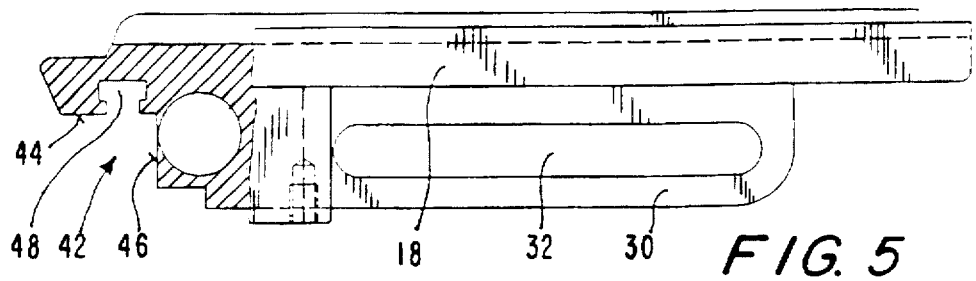
FIG. 5 is a partially cut top view partially plan and partially section of the side wall of the protective hood shown in FIGS. 3 and 4.

Referring now to FIG. 5, each of the two side walls 18 has a vertical opening 42 with two bordering surfaces 44, 46 arranged at right angle to each other on its front outside side area. In the bordering surface 44, which runs in the longitudinal direction of the side wall 18, is a vertical groove 48 with a T-shaped cross-section. The lower end of each vertical groove 48 is open and can be closed by a closing element, not shown in greater detail, for example, a screw.

Figure 8:
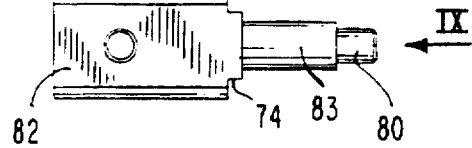
FIG. 8 is a top plan view of the sliding bar connecting the clamping body to the run-on strip.
Figure 11:
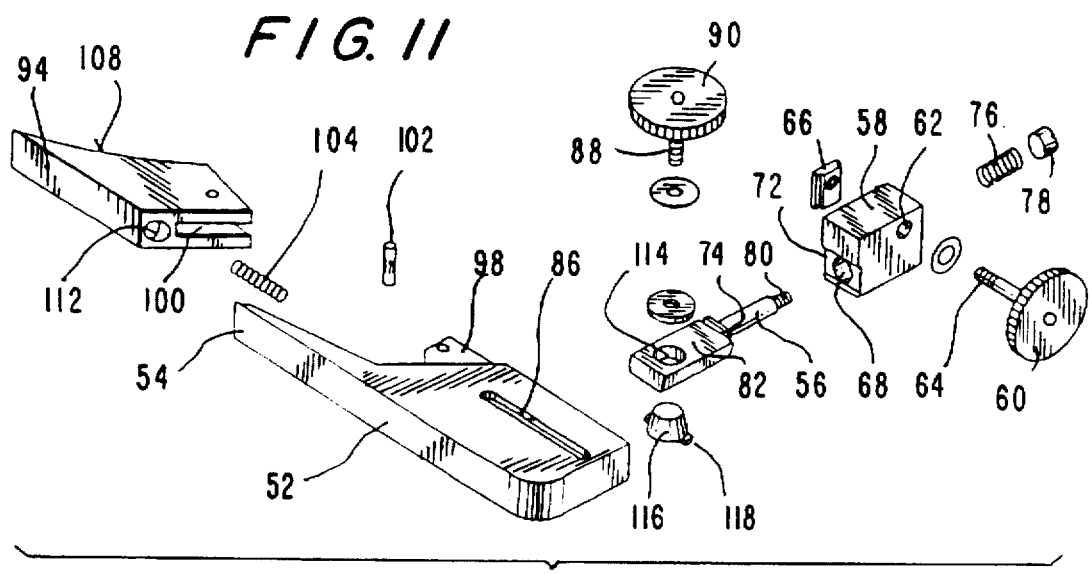
FIG. 11 is an exploded perspective view of the run-on strip with the clamping body as shown in FIG. 10.

A run-on ring 50 (FIG. 1) serves to guide a curved workpiece (not shown) to be processed by the cutting tool 16. The run-on ring 50 is mounted by means of a ball bearing on the spindle 14. To ensure safe guidance of the workpiece to the cutting tool 16, a run-on strip 52 is provided, the free projecting beak-shaped tip 54 of which lies across from the outer circumference of the run-on ring 50. At its other end, the run-on strip 52 is connected via a sliding bar 56 (FIGS. 6 to 8), including a plate-like portion 82 and a cylindrical portion 83, to a clamping body in a form of a quadriform sliding block 58. The sliding block 58 is disposed in the vertical opening 42 (FIG. 5) in the outside of the side wall 18 and is secured in the vertical groove 48 with the assistance of a clamping screw 60 (FIG. 3). The clamping screw 60 is inserted through a horizontal boring 62 (FIG. 6) in the sliding block 58 and engages, with its threaded end 64 (FIG. 11), into a clamping block 66 (FIG. 11), which can be moved in the vertical groove 48. When the clamping screw 60 is loosened, the sliding block 58 and, with it, the run-on strip 52, can be shifted up and down.

As FIGS. 6 to 9 show, the sliding block 58 has a horizontal boring 68 at right angle relation to the boring 62 below. The horizontal boring 68 is partially closed by a shoulder 70 at the end pointing toward the run-on strip 52. Outside of the horizontal boring 68, a quadriform polygonal seat 72, which is fitted into the front of the sliding block 58, is connected to the shoulder 70. Fitted into the polygonal seat 72 is a part 74 of the sliding bar 56 that has a shape corresponding to the quadriform polygonal cross-section of the seat 72. A coil spring 76 is seated around the cylindrical part 83 of the sliding bar 56 located in the horizontal boring 68 of the sliding block 58. The spring 76 rests on the shoulder 70 on one side and on a flange 78 at the other side. The flange 78 is screwed onto a threaded end 80 of the bar 56.

Figure 6:
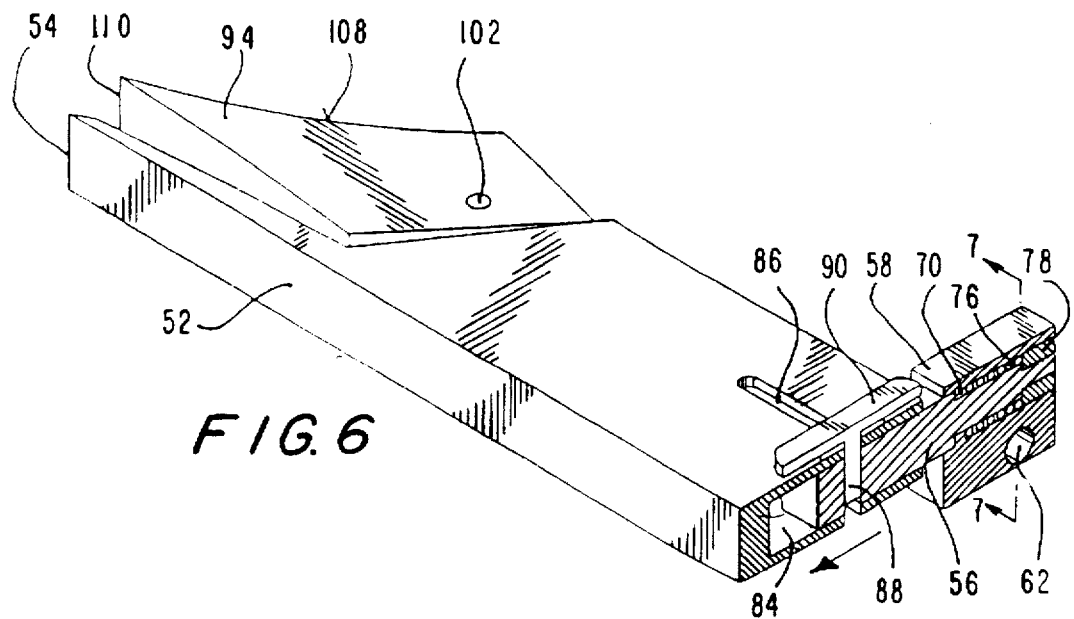
FIG. 6 is a perspective view of the run-on strip with the frontal portion cut away, showing the clamping body with the sliding bar connecting it to the run-on strip.
Figure 9:
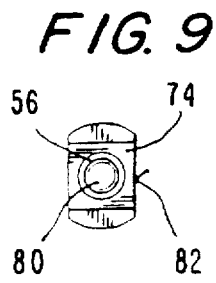
FIG. 9 is an end view of the sliding bar in the direction of arrow IX in FIG. 8.
Figure 7:
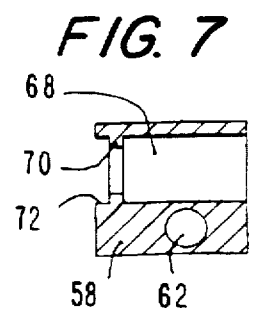
FIG. 7 is a longitudinal section through the clamping body designed as a sliding block taken along the line 7—7 in FIG. 6.

By means of a manual pulling movement in the direction of the arrow in FIG. 6, the part 74 with the polygonal cross-section can be withdrawn from the polygonal seat 72 for the purpose of pivoting the cylindrical sliding bar 56—and, with it, the attached run-on strip 52—out of the first detent position and into the second detent position located at 90° relative to the first or vice versa. As illustrated in FIG. 1, the run-on strip 52 is in its working or first detent position. FIG. 2 shows that the run-on strip 52 is in its rest or second detent position where the run-on strip 52 is pivoted upward. In such a condition, the milling machine may work with a curved cutting stop 50' substituted for the run-on ring 50.

The portion of the sliding bar 56 protruding from the sliding block 58 is embodied as a flattened, plate-like end 82, which engages into a slot 84 in the run-on strip 52. The run-on strip 52 has a longitudinal slot 86 on its top side and a longitudinal slot 86 on its bottom side (not shown) in register with the top slot 86; the longitudinal slots 86 run in the longitudinal direction of the run-on strip 52. The threaded shaft 88 of an adjustment screw 90 passes through the upper longitudinal slot 86, so that the run-on strip 52 may be adjusted in the longitudinal direction and may be rotated around the axis of the threaded shaft 88. It is thus possible to push the beak-shaped tip 54 of the run-on strip 52 as close as possible toward the run-on ring 50.

FIGS. 3, 4 and 6, in particular, show that a friction braking element 92 is located at the free end of the run-on strip 52. When the run-on strip 52 is in the working position, the friction braking element 92 comes into contact with the outside of the run-on ring 50. The friction braking element 92 comprising an insert 94, which is placed in an opening 96 in the run-on strip 52 that is open toward the run-on ring 50. The insert 94 is made, preferably, of low-wear plastic which may ensure quiet braking of the rotating run-on ring 50. A mounting plate 98 extending out from the run-on strip 52 is located in the area where the opening 96 is controlled. The mounting plate 98 engages into a slot 100 in the insert 94 and carries an axle 102, via which the insert 94 is mounted to be pivotal against the force of a spring 104. The spring 104 rests in a boring 106 in the run-on strip 52 on one side and in a hole 112 in the insert 94 on the other, thereby repress the insert 94 against the outer surface of the run-on ring 50, when the run-on strip 52 has the appropriate angular position. The insert 94 has a concave curved surface 108 facing the run-on ring 50 that has substantially the same curvature. The free pointed end 110 of the curved surface 108, which rests on the run-on ring 50 in the working position, is located across from and closely adjacent to the projecting beak-shaped tip 54 of the run-on strip 52 when the insert 94 is pivoted completely or almost completely into the opening 96 of the run-on strip 52 against the force of the spring 104. As a result, the smoothest most step-free transition is ensured as the workpiece is fed from the tip 54 of the run-on strip 52 to the outer circumference of the run-on ring 50 in all working positions of the run-on strip 52. In an alternate embodiment shown in FIGS. 10 and 11, the threaded shaft 88 of the adjustment screw 90 (which is used to fix the selected setting of the run-on strip 52 on the plate-like end 82 of the sliding bar 56) passes through the upper longitudinal slot 86 in the run-on strip 52. In this alternative, a continuous conical boring 114, into which a conical clamping body 116 fits, is fitted into the plate-like end 82. The conical clamping body 116 has a larger diameter at its bottom end and a guide rail 118 in the bottom end that slidably engages the lower longitudinal slot 86 located opposite the upper longitudinal slot 86. When the adjustment screw 90 is loosened, the run-on strip 52 may thus be adjusted in the direction of the longitudinal slot 86 with the guide rail 118 serving as a longitudinal guide in the lower longitudinal slot.

Figure 10:
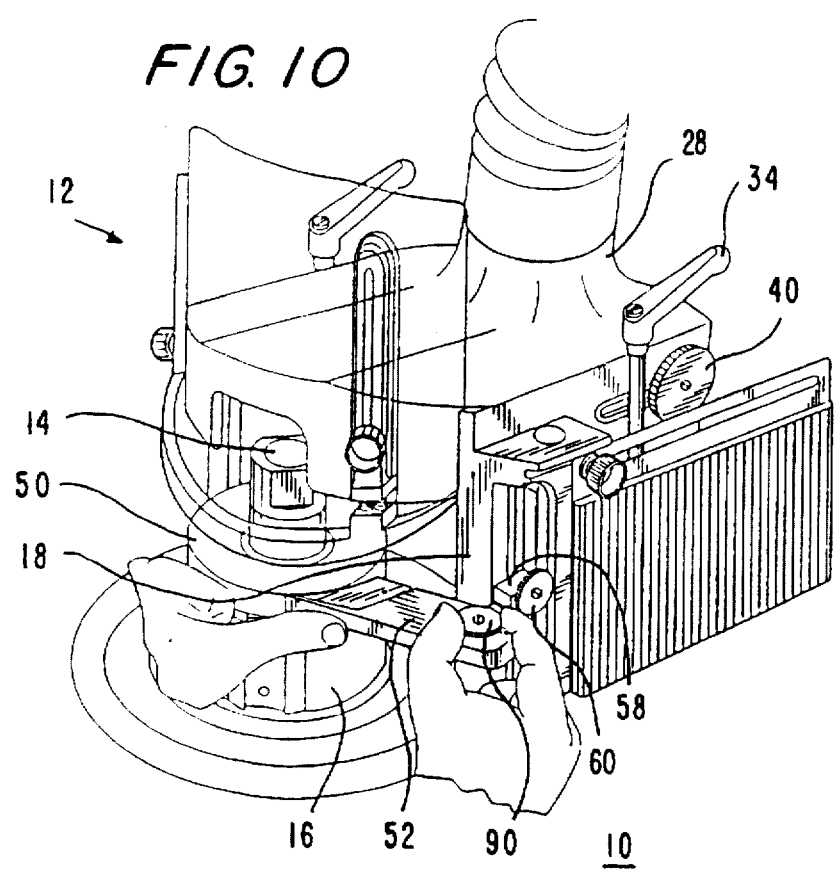
FIG. 10 is a perspective view of a protective hood with a modified run-on strip.

When the run-on strip 52 is set up in the working position as shown in FIG. 10, the adjustment screw 90 is tightened. Therefore the run-on strip 52 is fixed on the plate-like end 82 of the sliding bar 56 via the conical clamping body 116. Since a large friction force can be produced via the conical clamping body 116, the security of the working position of the run-on strip 52 is thus enhanced. Moreover, less effort than that described in the first embodiment may be required to tighten the adjustment screw 90.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A device for ensuring a smooth movement of a workpiece during the operation of a milling machine, comprising a clamping body including a sliding block having a boring therein, a first coil spring disposed within said boring, a sliding bar having one end portion slidably disposed within said first coil spring in said boring, and a run-on strip including a beak-like friction braking element adjustably engaged in the other end portion of said sliding bar.

2. The device in claim 1, further comprising a protective hood for said milling machine including a side wall having an outward facing groove, and a clamping screw mounted on said sliding block and slidably disposed in said outward facing groove for adjustably attaching said sliding block to side wall of said protective hood.

3. The device in claim 1, wherein said sliding block has a quadriform polygonal seat for defining two detent positions, and said other end portion of said sliding bar has a corresponding quadriform polygonal cross-section positioned in said polygonal seat for defining a working and a rest position for said run-on strip.

4. The device in claim 1, further comprising a flange fixed to said one end of said sliding bar and a shoulder on said sliding block extending into said boring, said first coil spring engaging both said flange and said shoulder for biasing said sliding bar in the direction of said one end.

5. The device in claim 1, wherein said run-on strip has a side slot and a first longitudinal slot, and said other end portion of said sliding bar is movably disposed in said side slot, and further comprising an adjustment screw passing through said first longitudinal slot of said run-on strip for adjustably fixably positioning said sliding bar.

6. The device in claim 5, wherein said sliding bar has a conical boring and said run-on strip has a second longitudinal slot, and further comprising a conical clamping body disposed in said conical boring and threadably connected to said adjustment screw, a guide rail at the larger diameter end of said conical clamping body fitted into said second longitudinal slot of said run-on strip for adjustable fixably positioning said sliding bar.

7. The device in claim 3, wherein said run-on strip has a boring, a free end, a recess located at said free end, and further comprising a run-on ring in contact with said run-on strip when said run-on strip is in said working position, an insert having a hole, a slot, and a concave curved surface facing said run-on ring, said run-on strip further comprising a mounting plate disposed in said slot of said insert, an axle mounted on said mounting plate for pivotally mounting said insert, a second coil spring having one end disposed in said boring and another end disposed in said hole in said insert for urging said insert into engagement with said run-on ring.

8. The device in claim 7, wherein said insert is made of low-wear plastic.

9. The device in claim 7, wherein said workpiece is mountable on said run-on ring.

* * * * *